(12) United States Patent
Tsumiyama et al.

(10) Patent No.: US 10,196,094 B2
(45) Date of Patent: Feb. 5, 2019

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/393,475

(22) Filed: Dec. 29, 2016

(65) Prior Publication Data

US 2018/0186410 A1 Jul. 5, 2018

(51) Int. Cl.
*B62D 21/02* (2006.01)
*B62D 25/16* (2006.01)
*B60K 11/04* (2006.01)
*B62D 25/20* (2006.01)
*B60R 21/13* (2006.01)

(52) U.S. Cl.
CPC ............. *B62D 25/16* (2013.01); *B60K 11/04* (2013.01); *B60R 21/13* (2013.01); *B62D 21/02* (2013.01); *B62D 25/2036* (2013.01); *B60Y 2200/20* (2013.01)

(58) Field of Classification Search
CPC .......... B60K 11/04; B60K 11/00; B60K 11/08
See application file for complete search history.

(56) References Cited

U.S. PATENT DOCUMENTS

| | | | | |
|---|---|---|---|---|
| 5,816,351 A | * | 10/1998 | Akira | B60K 11/08 180/68.1 |
| 7,819,220 B2 | * | 10/2010 | Sunsdahl | B62D 21/183 180/312 |
| 8,215,443 B2 | * | 7/2012 | Miura | B60K 13/04 180/296 |
| 8,381,855 B2 | * | 2/2013 | Suzuki | B60K 11/04 180/296 |
| 8,453,775 B2 | * | 6/2013 | Belzile | B60K 11/02 180/291 |
| 8,459,397 B2 | * | 6/2013 | Bessho | B60K 5/04 180/291 |
| 8,544,582 B2 | * | 10/2013 | Kaku | B60K 13/04 180/309 |
| 8,813,900 B2 | * | 8/2014 | Poulin | B60K 5/00 180/309 |

(Continued)

*Primary Examiner* — James A Shriver, II
*Assistant Examiner* — Vaughn Coolman
(74) *Attorney, Agent, or Firm* — Wenderoth, Lind & Ponack, L.L.P.

(57) ABSTRACT

A utility vehicle includes: a pair of left and right bottom first frame and bottom second frame extending in a front-rear direction and supporting a floor plate; a bottom front frame, coupling a front end of the bottom first frame and a front end of the bottom second frame, extending linearly in a width direction and to which a first support member of a gear box for front wheels is welded; a front vertical frame coupled to the bottom front frame and extending in a top-bottom direction; and a door frame supporting a door and extending in the top-bottom direction, a fender cover provided behind a front wheel so that a front end thereof is attached to the front vertical frame and a rear end thereof is attached to the door frame, and a rear portion of the fender cover for the front wheel rising perpendicular to a horizontal plane.

2 Claims, 9 Drawing Sheets

(56) References Cited

U.S. PATENT DOCUMENTS

| | | | | |
|---|---|---|---|---|
| 8,869,929 | B2* | 10/2014 | Yamamoto | B62D 21/12 180/311 |
| 8,997,908 | B2* | 4/2015 | Kinsman | B62D 21/183 180/89.1 |
| 9,440,527 | B1* | 9/2016 | Maeda | B60K 11/04 |
| 9,789,909 | B2* | 10/2017 | Erspamer | B62D 23/005 |
| 2005/0173177 | A1* | 8/2005 | Smith | B60K 17/354 180/233 |
| 2010/0314184 | A1* | 12/2010 | Stenberg | B60K 1/04 180/65.6 |
| 2012/0217078 | A1* | 8/2012 | Kinsman | B60R 21/13 180/69.4 |
| 2016/0186643 | A1* | 6/2016 | Itoo | F01P 11/12 123/41.57 |
| 2017/0029035 | A1* | 2/2017 | Dube | B60K 15/063 |

* cited by examiner

UTILITY VEHICLE

BACKGROUND OF THE INVENTION

1. Field of the Invention

The present invention relates to a utility vehicle.

2. Description of the Related Art

Conventionally, a fender cover for a front wheel of a utility vehicle is inclined downward toward a front side in a top-bottom direction, as described in U.S. Pat. No. 8,869,929 B2. The fender cover is made up of plate members that have a flat surface and are coupled to each other, and a connection part between the flat surfaces is bent in the vehicle width direction.

SUMMARY OF THE INVENTION

This makes it hard for mud or the like on the fender cover to come off.

In view of this, a purpose of the present invention is to provide a utility vehicle including a fender cover that allows mud or the like thereon to easily come off.

In order to achieve the above purpose, the present invention provides a utility vehicle including: a pair of left and right bottom first frame and bottom second frame that extend in a front-rear direction and support a floor plate; a bottom front frame that couples a front end of the bottom first frame and a front end of the bottom second frame and extends linearly in a vehicle width direction and to which a first support member of a gear box for front wheels is welded; a front vertical frame that is coupled to the bottom front frame and extends in a top-bottom direction; and a door frame that supports a door and extends in the top-bottom direction, a fender cover for a front wheel being provided behind the front wheel so that a front end thereof is attached to the front vertical frame and a rear end thereof is attached to the door frame, and a rear portion of the fender cover for the front wheel rising perpendicular to a horizontal plane.

According to the configuration, the rear portion of the fender cover for the front wheel rises perpendicular to the horizontal plane. It is therefore possible to provide a fender cover that allows mud or the like thereon to easily come off.

The present invention preferably further includes the following configurations.

(1) The rear portion is smoothly curved in the vehicle width direction.

(2) In the configuration (1), a radiator is provided on an inner side, in the vehicle width direction, of the fender cover for the front wheel.

(3) In the configuration (1), an end surface, on an outer side in the vehicle width direction, of the rear portion is located behind an end surface, on an inner side in the vehicle width direction, of the rear portion.

According to the configuration (1), the rear portion of the fender cover for the front wheel is smoothly curved in the vehicle width direction. It is therefore possible to provide a fender cover that allows mud or the like thereon to more easily come off than in a case where a bent portion is provided.

According to the configuration (2), the radiator is located on an inner side, in the vehicle width direction, of the fender cover for the front wheel. This allows exhaust heat of the radiator to be effectively guided from an inner side in the vehicle width direction to an outer side in the vehicle width direction by the rear portion of the fender cover for the front wheel.

According to the configuration (3), the end surface on an outer side in the vehicle width direction of the rear portion of the fender cover for the front wheel is located behind the end surface on an inner side in the vehicle width direction of the rear portion of the fender cover for the front wheel. This allows a foreign substance from an outside to be effectively guided from an inner side in the vehicle width direction to an outer side in the vehicle width direction by the curve of the rear portion.

According to the present invention, it is possible to provide a utility vehicle including a fender cover that allows mud or the like thereon to easily come off.

DETAILED DESCRIPTION OF THE INVENTION

A utility vehicle according to an embodiment of the present invention will now be described below with reference to the accompanying drawings. A utility vehicle is a vehicle mainly for off-road travelling not only on a grass field, a gravel field, and a sandy field, but also on unpaved mountain road and forest road, a muddy road, and a rocky field. For convenience of description, it is assumed that a direction toward which the utility vehicle travels is a "front side" of the utility vehicle and parts thereof and that left and right, in a vehicle width direction, of a driver of the utility vehicle facing forward is "left and right" of the utility vehicle and the parts thereof.

[Overall Structure of Vehicle]

Figure 1:
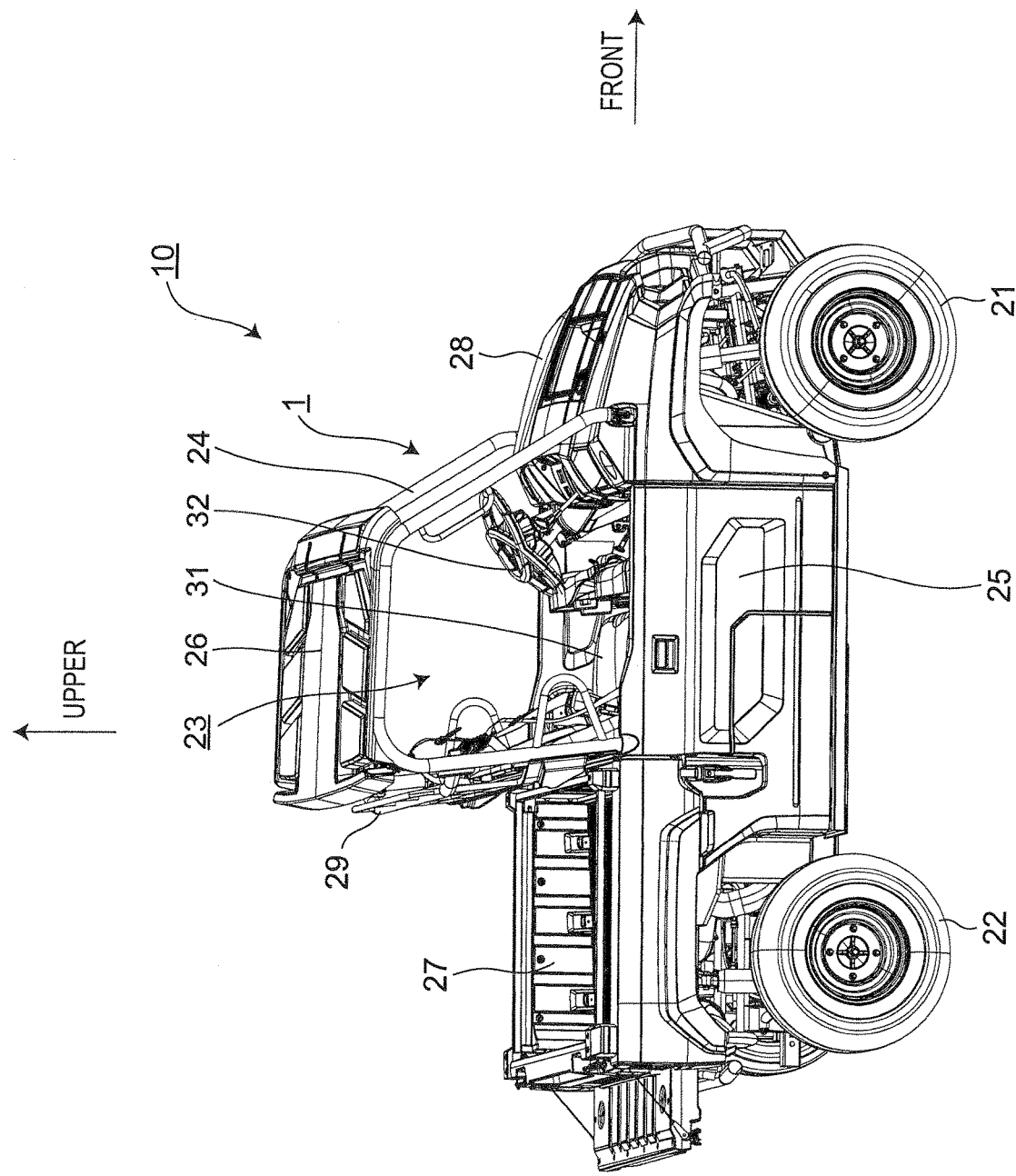
FIG. 1 is a perspective view of a utility vehicle according to an embodiment of the present invention.

FIG. 1 is a perspective view of a utility vehicle having a frame structure according to an embodiment of the present invention.

As illustrated in FIG. 1, a utility vehicle 10 includes a pair of left and right front wheels 21 on a front side of a body thereof, a pair of left and right rear wheels 22 on a rear side of the body, and a riding space (cabin) 23 between the front wheels 21 and the rear wheels 22. The riding space 23 is surrounded by a ROPS 24, a pair of left and right doors 25, and a top plate 26. The ROPS is an abbreviation of a rollover protective structure, and is part of a body frame 1. The top plate 26 is attached onto an upper end of the ROPS 24.

A cargo bed 27 is provided behind the riding space 23, and a bonnet 28 is provided ahead of the riding space 23. A screen 29 that serves as a partition between the cargo bed 27 and the riding space 23 is provided at a front end of the cargo bed 27.

A pair of left and right independent seats 31 are provided in the riding space 23. Operating units such as a steering wheel 32 and the like are provided ahead of the seats 31.

[Frame Structure]

Figure 2:
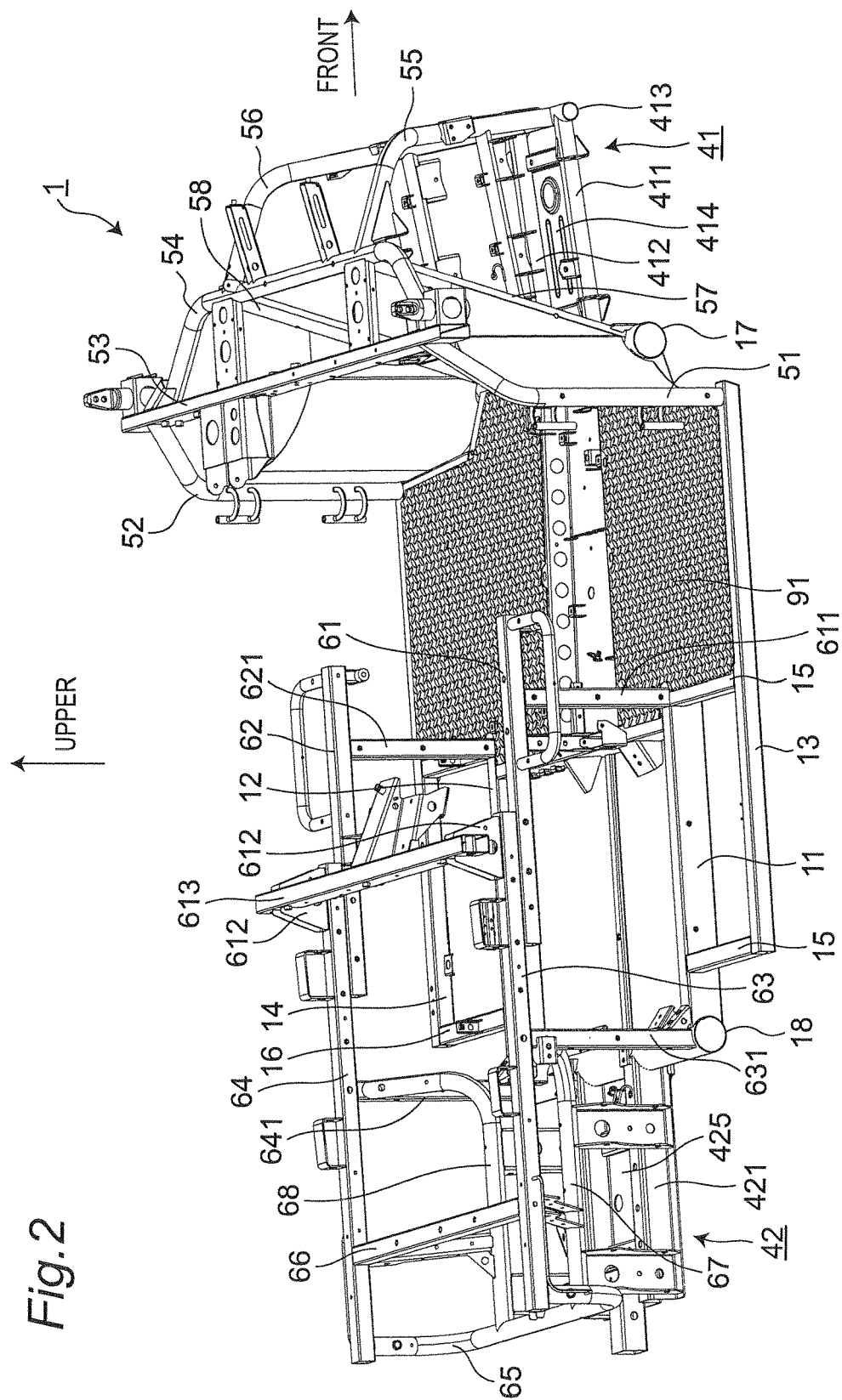
FIG. 2 is a perspective view of a body frame of the utility vehicle of FIG. 1.
Figure 3:
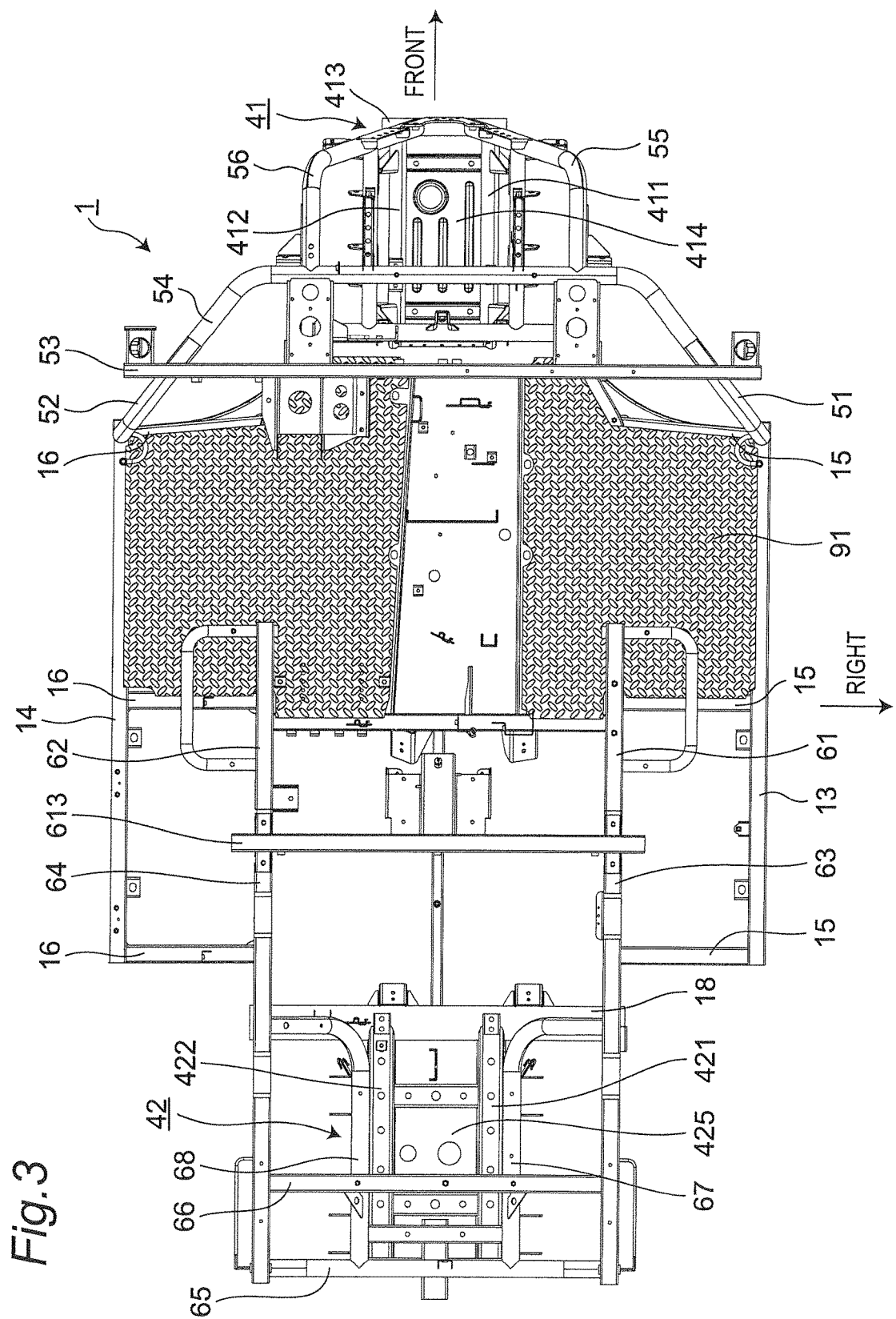
FIG. 3 is a top view of FIG. 2.
Figure 4:
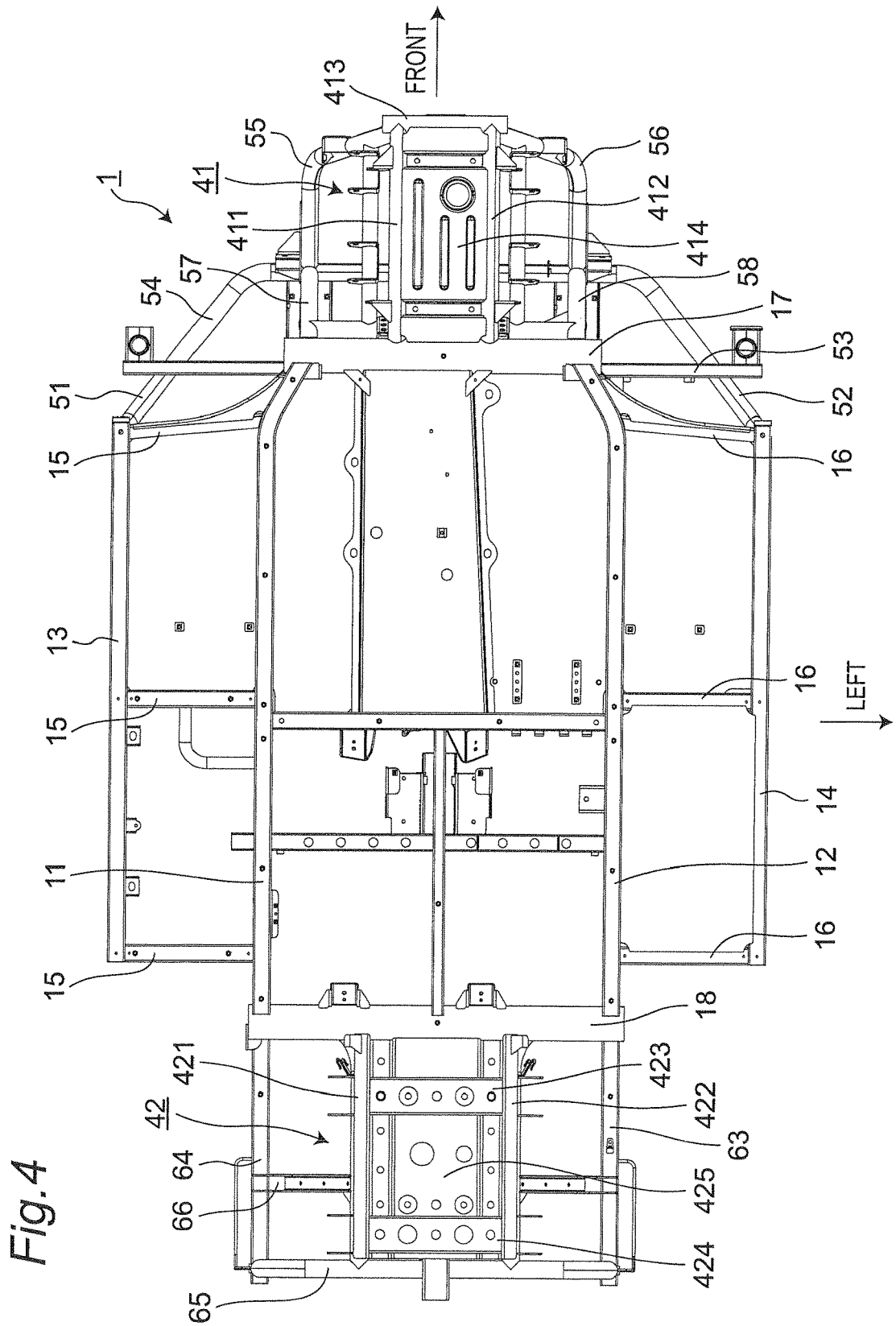
FIG. 4 is a bottom view of FIG. 2.
Figure 5:
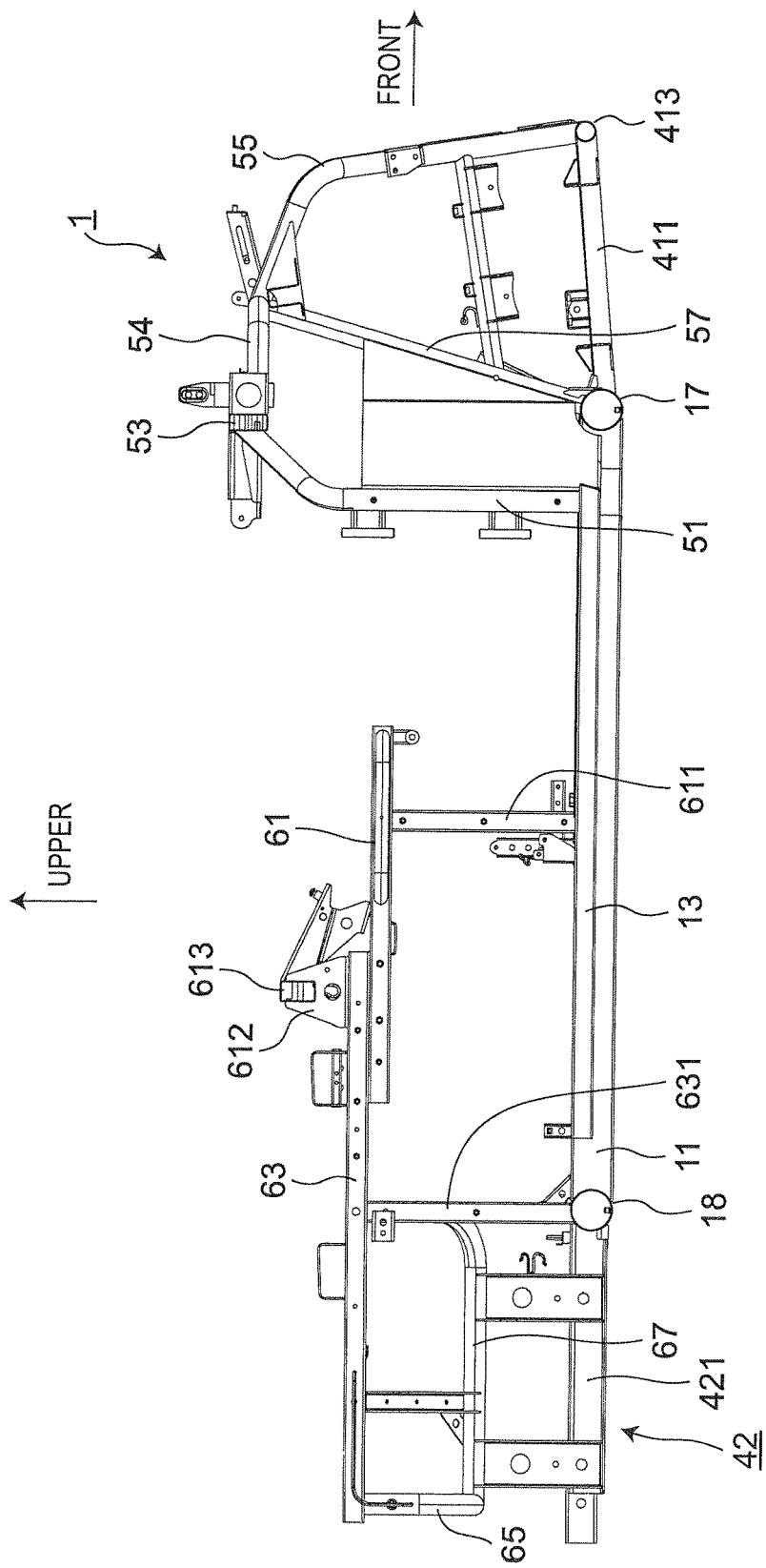
FIG. 5 is a right side view of FIG. 2.

FIG. 2 is a perspective view of the body frame 1 of the utility vehicle 10 of FIG. 1. FIG. 3 is a top view of FIG. 2, and FIG. 4 is a bottom view of FIG. 2. FIG. 5 is a right side view of FIG. 2. In FIGS. 2 to 5, the ROPS 24 of the body frame 1 is omitted.

As illustrated in FIGS. 2 to 5, the body frame 1 includes, in a bottom portion thereof, a pair of left and right bottom first frame 11 and bottom second frame 12 that extend substantially horizontally in a front-rear direction and support a floor plate 91 and a pair of left and right bottom side frames 13 and 14 that are provided on outer sides, in a vehicle width direction, of the bottom first frame 11 and the bottom second frame 12, extend substantially horizontally in the front-rear direction, and support the floor plate 91. The bottom first frame 11 and the bottom second frame 12 are square pipe frames.

The bottom first frame 11 and the bottom side frame 13 are coupled to each other by a plurality of bottom cross frames 15 that extend substantially horizontally in the vehicle width direction (left-right direction) and that are provided at certain intervals in the front-rear direction.

A door frame 51 that supports the door 25 is coupled to a front end of the bottom side frame 13. The door frame 51 extends upward from the front end of the bottom side frame 13 and then extends inward in the vehicle width direction toward the upper side.

The bottom second frame 12 and the bottom side frame 14 are coupled to each other by a plurality of bottom cross frames 16 that extend substantially horizontally in the vehicle width direction (left-right direction) and that are provided at certain intervals in the front-rear direction.

A door frame 52 that supports the door 25 is coupled to a front end of the bottom side frame 14. The door frame 52 extends upward from the front end of the bottom side frame 14 and then extends inward in the vehicle width direction toward the upper side.

The body frame 1 includes a bottom front frame 17 that couples a front end of the bottom first frame 11 and a front end of the bottom second frame 12 and that extends substantially horizontally in a linear manner in the left-right direction. The bottom front frame 17 is a cylindrical pipe frame.

A ROPS mount front frame 53 is provided above the bottom front frame 17. The ROPS mount front frame 53 extends substantially horizontally in the left-right direction and couples an upper end of the door frame 51 and an upper end of the door frame 52, and the ROPS 24 is coupled to the ROPS mount front frame 53. A front U shape frame 54 having a U shape protruding toward the front side is coupled to a front portion of the ROPS mount front frame 53.

A front gear support member 41 that supports a gear box for front wheels from below is provided ahead of the bottom front frame 17. The front gear support member 41 includes a pair of left and right front gear support frames 411 and 412 that extend in the front-rear direction so as to be inclined upward toward the front side, a front gear support front frame 413 that couples front ends of the front gear support frames 411 and 412, and a front gear under guard 414 having a rectangular shape that couples intermediate portions of the front gear support frames 411 and 412. The front gear support frames 411 and 412 are joined to the bottom front frame 17 by welding.

A pair of left and right front curved frames 55 and 56 are provided on a front portion of the front U shape frame 54. The front curved frames 55 and 56 extend from the front portion of the front U shape frame 54 downward toward the front side and then extend downward and are coupled to the front gear support front frame 413.

The front U shape frame 54 is coupled to left and right ends of the bottom front frame 17 by a pair of left and right front vertical frames 57 and 58 that extend downward and backward from a lower portion of the front U shape frame 54.

The body frame 1 includes a bottom rear frame 18 that couples a rear end of the bottom first frame 11 and a rear end of the bottom second frame 12 and that extends substantially horizontally in a linear manner in the left-right direction. The bottom rear frame 18 is a cylindrical pipe frame.

A rear gear support member 42 that supports a gear box for rear wheels from below is provided behind the bottom rear frame 18. The rear gear support member 42 includes a pair of left and right rear gear support frames 421 and 422 that extend substantially horizontally in the front-rear direction, a rear gear support intermediate frame 423 that couples intermediate portions, in the front-rear direction, of the rear gear support frames 421 and 422, a rear gear support rear frame 424 that couples rear portions, in the front-rear direction, of the rear gear support frames 421 and 422, and a rear gear under guard 425 having a rectangular shape that is supported by the rear gear support intermediate frame 423 and the rear gear support rear frame 424 from below. The rear gear support frames 421 and 422 are joined to the bottom rear frame 18 by welding.

A pair of left and right seat frames 61 and 62 that extend substantially horizontally in the front-rear direction and support the seats 31 are provided above the bottom first frame 11 and the bottom second frame 12. The seat frame 61 is coupled to the bottom first frame 11 by an intermediate vertical frame 611 extending in the top-bottom direction. The seat frame 62 is coupled to the bottom second frame 12 by an intermediate vertical frame 621 extending in the top-bottom direction.

An upper first frame 63 is provided above the seat frame 61. The upper first frame 63 is joined to an upper surface of a rear portion of the seat frame 61, extends substantially horizontally in the front-rear direction to a rear end of the vehicle body along the seat frame 61, and supports the cargo bed 27. An upper second frame 64 is provided above the seat frame 62. The upper second frame 64 is joined to an upper surface of a rear portion of the seat frame 62, extends substantially horizontally in the front-rear direction to the rear end of the vehicle body along the seat frame 62, and supports the cargo bed 27.

The upper first frame 63 is coupled to a right end of the bottom rear frame 18 by a rear vertical frame 631 extending in the top-bottom direction.

The upper second frame 64 is coupled to a left end of the bottom rear frame 18 by a rear vertical frame 641 extending in the top-bottom direction.

A ROPS mount rear frame 613 is provided above the upper first frame 63 and the upper second frame 64. The ROPS mount rear frame 613 extends substantially horizontally in the left-right direction and couples the upper first frame 63 and the upper second frame 64 via support members 612, and the ROPS 24 is coupled to the ROPS mount rear frame 613.

A rear end of the upper first frame 63 and a rear end of the upper second frame 64 are coupled by a rear U shape frame 65 having a U shape that extends in the left-right direction and protrudes downward. The upper first frame 63 and the upper second frame 64 are also coupled, at intermediate portions thereof in the front-rear direction, by a rear cross frame 66 that extends substantially horizontally in the left-right direction.

The rear vertical frame 631 and the rear U shape frame 65 are coupled by a rear L shape frame 67 having a substantially L shape that extends inward in the vehicle width direction and backward from an inner side surface, in the vehicle width direction, of the rear vertical frame 631.

The rear vertical frame 641 and the rear U shape frame 65 are coupled by a rear L shape frame 68 having a substantially L shape that extends inward in the vehicle width direction and backward from an inner side surface, in the vehicle width direction, of the rear vertical frame 641.

[Structure of Fender Covers for Front Wheels]

Figure 6:
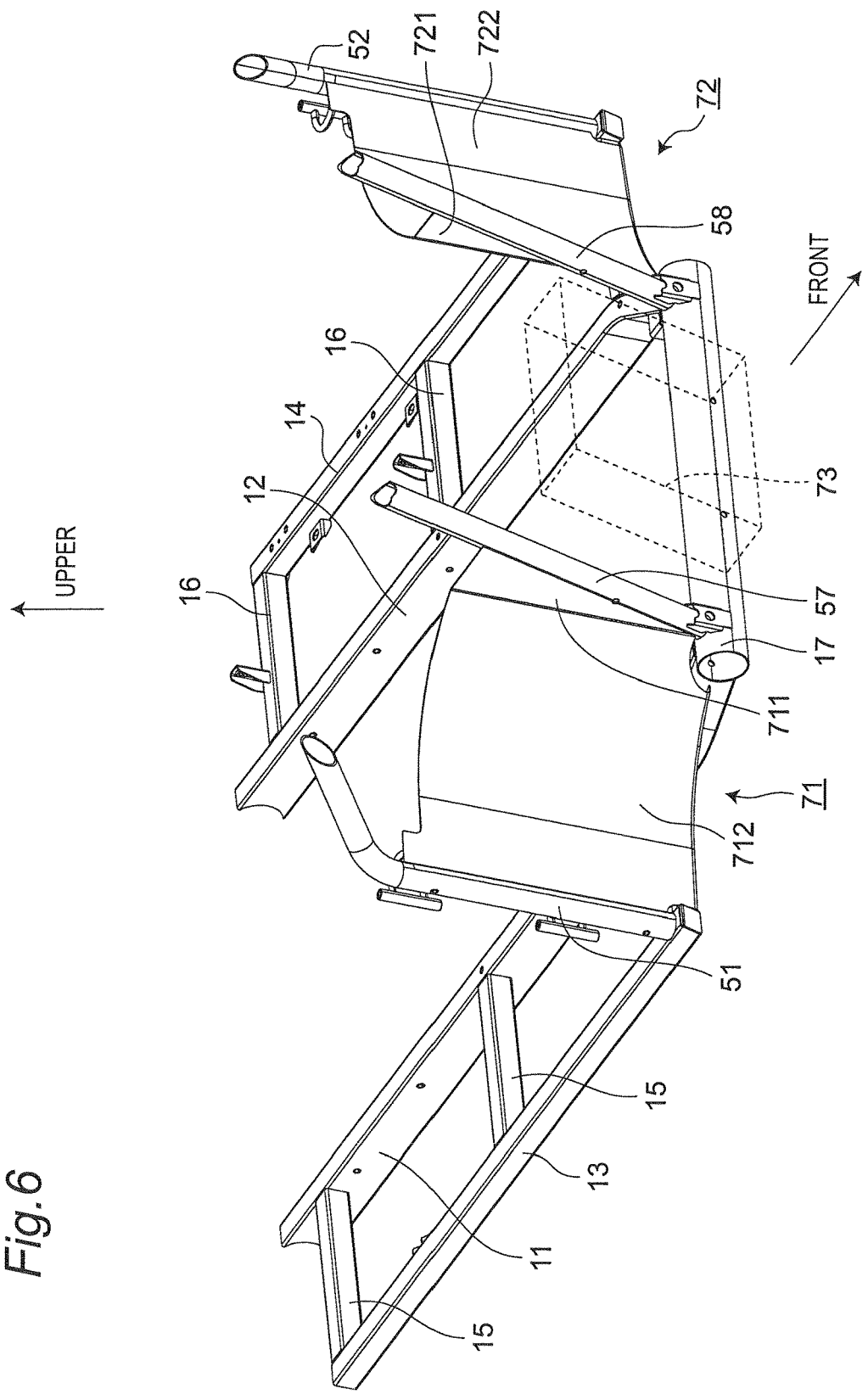
FIG. 6 is a perspective view of fender covers for front wheels and surroundings thereof.
Figure 7:
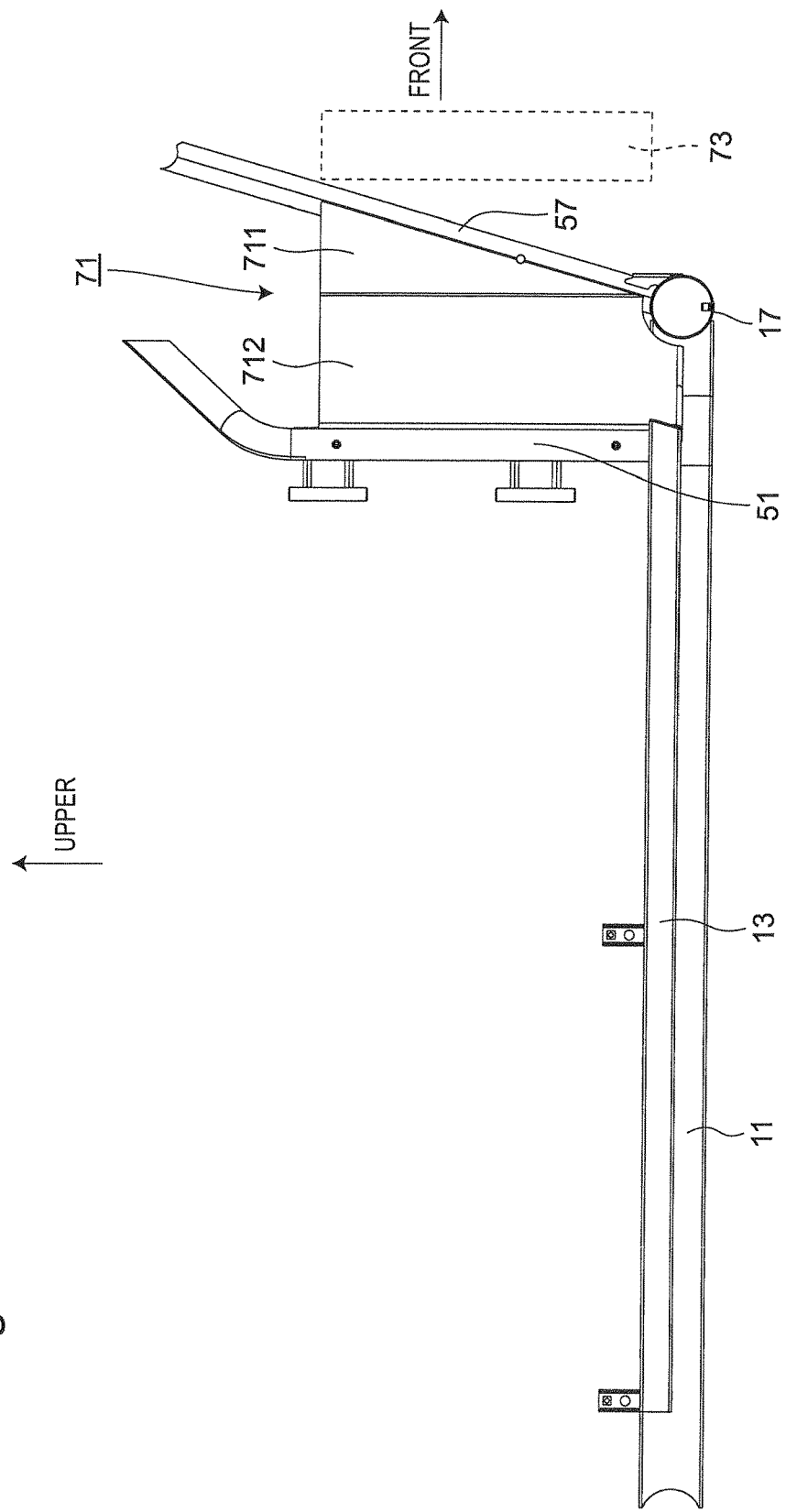
FIG. 7 is a right side view of FIG. 6.
Figure 8:
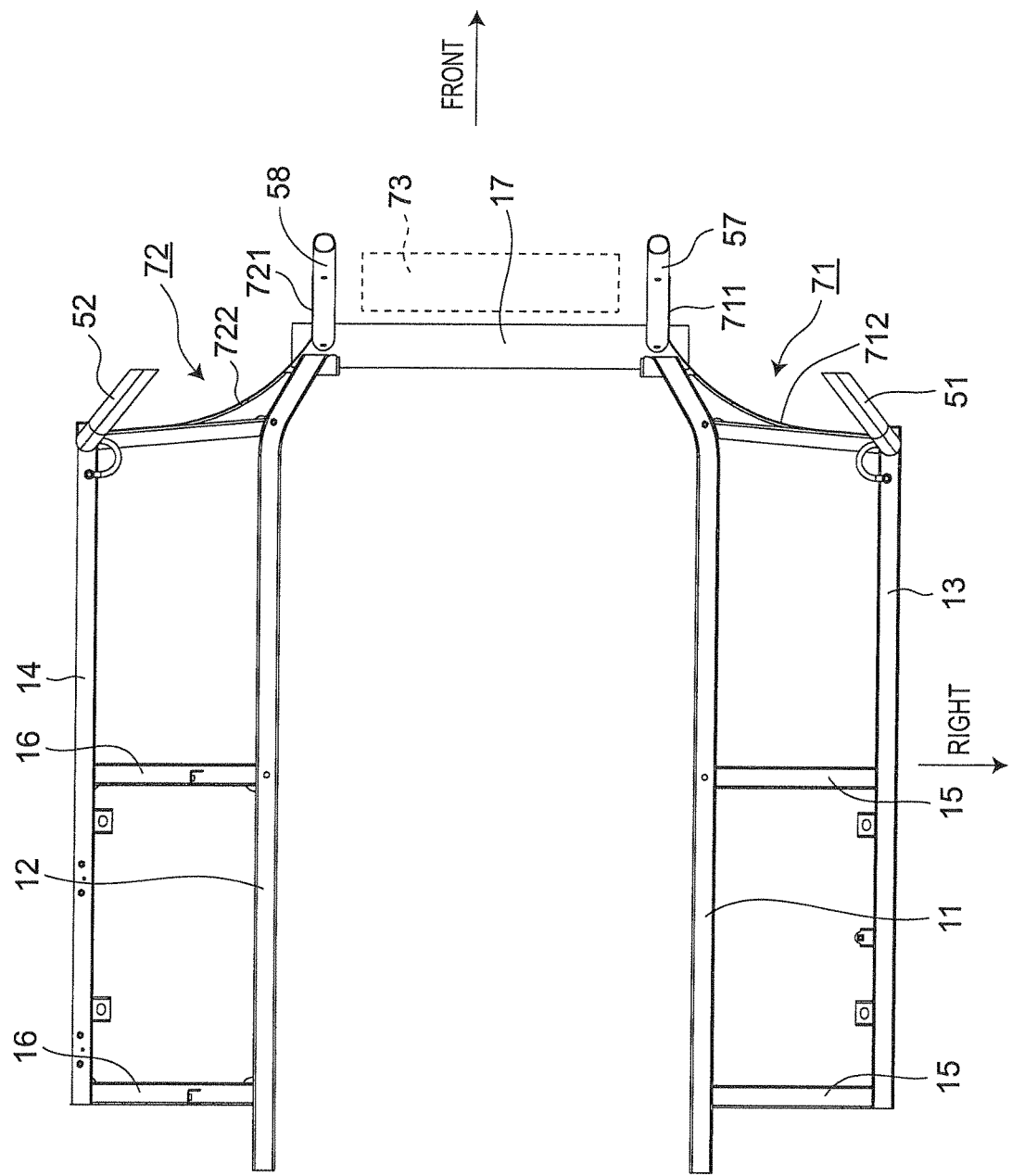
FIG. 8 is a top view of FIG. 6.
Figure 9:
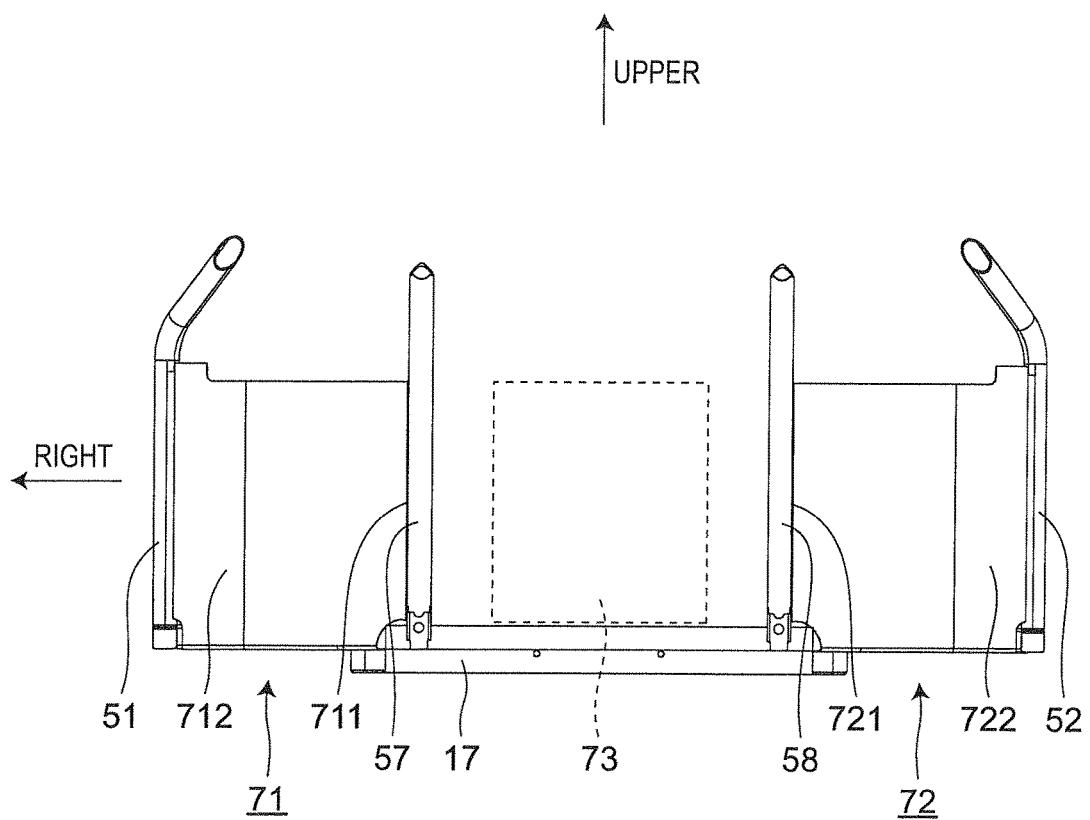
FIG. 9 is a front view of FIG. 6.

FIG. 6 is a perspective view of fender covers for front wheels and surroundings thereof. FIG. 7 is a right side view of FIG. 6, FIG. 8 is a top view of FIG. 6, and FIG. 9 is a front view of FIG. 6. As illustrated in FIGS. 6 to 9, a pair of left and right fender covers for front wheels 71 and 72 are provided. The fender cover for front wheel 71 is located behind the front wheel 21, and a front end and a rear end of the fender cover for front wheel 71 are attached to the front vertical frame 57 and the door frame 51, respectively. The fender cover for front wheel 72 is located behind the front wheel 21, and a front end and a rear end of the fender cover for front wheel 72 are attached to the front vertical frame 58 and the door frame 52, respectively. A radiator 73 is located on inner sides, in the vehicle width direction, of the fender covers for front wheels 71 and 72.

The fender cover for front wheel 71 includes a front portion 711 that is located on a front side and is attached to the front vertical frame 57 and a rear portion 712 that is located on a rear side and is attached to the door frame 51. The front portion 711 has an inverted triangular shape in side view and extends linearly in the front-rear direction in parallel with the bottom first frame 11 in top view. The rear portion 712 has a substantially rectangular shape in side view and extends so as to be smoothly curved outward in the vehicle width direction toward the rear side in top view. The rear portion 712 rises perpendicular to a horizontal plane, and an end surface, on an outer side in the vehicle width direction, of the rear portion 712 is located behind an end surface, on an inner side in the vehicle width direction, of the rear portion 712. A rear end of the front portion 711 and a front end of the rear portion 712 are joined by welding, and an upper end of the front portion 711 and an upper end of the rear portion 712 are located at the same height in side view.

The fender cover for front wheel 72 includes a front portion 721 that is located on a front side and is attached to the front vertical frame 58 and a rear portion 722 that is located on a rear side and is attached to the door frame 52. The front portion 721 has an inverted triangular shape in side view and extends linearly in the front-rear direction in parallel with the bottom second frame 12 in top view. The rear portion 722 has a substantially rectangular shape in side view and extends so as to be smoothly curved outward in the vehicle width direction toward the rear side in top view. The rear portion 722 rises perpendicular to a horizontal plane, and an end surface, on an outer side in the vehicle width direction, of the rear portion 722 is located behind an end surface, on an inner side in the vehicle width direction, of the rear portion 722. A rear end of the front portion 721 and a front end of the rear portion 722 are joined by welding, and an upper end of the front portion 721 and an upper end of the rear portion 722 are located at the same height in side view.

The fender cover for front wheel 71 and the fender cover for front wheel 72 are provided so as to be symmetrical with respect to a central line, in the vehicle width direction, of the vehicle body in top view.

According to the utility vehicle 10 having the above configuration, the following effects can be produced.

(1) Since the rear portions 712 and 722 of the fender covers for front wheels 71 and 72 rise perpendicular to the horizontal plane, it is possible to provide the fender covers for front wheels 71 and 72 that allow mud or the like thereon to easily come off.

(2) Since the rear portions 712 and 722 of the fender covers for front wheels 71 and 72 are smoothly curved in the vehicle width direction, it is possible to provide the fender covers for front wheels 71 and 72 that allow mud or the like thereon to more easily come off than in a case where a bent portion is provided.

(3) Since the radiator 73 is located on inner sides, in the vehicle width direction, of the fender covers for front wheels 71 and 72, exhaust heat of the radiator 73 can be effectively guided from an inner side in the vehicle width direction to an outer side in the vehicle width direction by the rear portions 712 and 722 of the fender covers for front wheels 71 and 72.

(4) Since the end surfaces, on outer sides in the vehicle width direction, of the rear portions 712 and 722 of the fender covers for front wheels 71 and 72 are located behind the end surfaces, on inner sides in the vehicle width direction, of the rear portions 712 and 722 of the fender covers for front wheels 71 and 72, a foreign substance from an outside can be effectively guided from an inner side in the vehicle width direction to an outer side in the vehicle width direction by the curve of the rear portions.

(5) Since the radiator 73 is located on inner sides, in the vehicle width direction, of the fender covers for front wheels 71 and 72, and the end surfaces, on outer sides in the vehicle width direction, of the rear portions 712 and 722 of the fender covers for front wheels 71 and 72 are located behind the end surfaces, on inner sides in the vehicle width direction, of the rear portions 712 and 722 of the fender covers for front wheels 71 and 72, exhaust heat of the radiator 73 can be effectively guided from an inner side in the vehicle width direction to an outer side in the vehicle width direction by the curve of the rear portions.

(6) Since the fender covers for front wheels 71 and 72 couple the front vertical frames 51 and 52 and the door frames 57 and 58, respectively, the strength and rigidity of the body frame behind the front wheels can be improved by the fender covers for front wheels 71 and 72.

In the above embodiment, the front portions 711 and 721 and the rear portions 712 and 722 of the fender covers for front wheels 71 and 72 are coupled by welding, respectively. However, the front portions and the rear portions may be provided as integral portions. In this case, the whole fender covers for front wheels rise perpendicular to the horizontal plane and are smoothly curved in the vehicle width direction. Furthermore, end surfaces, on outer sides in the vehicle width direction, of the whole fender covers for front wheels are located behind end surfaces, on inner sides in the vehicle width direction, of the whole fender covers for front wheels.

The upper ends of the front portions 711 and 721 and the upper ends of the rear portions 712 and 722 of the fender covers for front wheels 71 and 72 are located at the same height in side view, respectively, in the above embodiment but may be located at different heights. In this case, it is preferably that the upper ends of the rear portions be higher than the upper ends of the front portions in view of splash of mud or the like from the front wheels 21.

Various modifications and changes can be made without departing from the spirit and scope of the present invention described in the claims.

The invention claimed is:

1. A utility vehicle comprising:
   a pair of left and right bottom first frame and bottom second frame that extend in a front-rear direction and support a floor plate;
   a bottom front frame that couples a front end of the bottom first frame and a front end of the bottom second frame and extends linearly in a vehicle width direction and to which a first support member of a gear box for front wheels is welded;
   a front vertical frame that is coupled to the bottom front frame and extends in a top-bottom direction;
   a door frame that supports a door and extends in the top-bottom direction;
   a fender cover for a front wheel, the fender cover being provided behind the front wheel so that a front end thereof is attached to the front vertical frame and a rear end thereof is attached to the door frame; and
   a radiator provided on an inner side of the fender cover in the vehicle width direction,
   wherein a rear portion of the fender cover extends from a bottom portion of the rear portion to a height of an upper end of the radiator, and a whole of the rear portion rises perpendicular to a horizontal plane, wherein:
   the fender cover for the front wheel includes a front portion that is located on a front side and is attached to the front vertical frame and a rear portion that is located on a rear side and is attached to the door frame,
   the front portion has an inverted triangular shape in side view and extends linearly in the front-rear direction, and the rear portion has a substantially rectangular shape in side view and extends so as to be smoothly curved outward in the vehicle width direction toward the rear side in top view, and
   an upper end of the front portion and an upper end of the rear portion are located at the same height in side view.

2. The utility vehicle according to claim 1, wherein an end surface, on an outer side in the vehicle width direction, of the rear portion is located behind an end surface, on an inner side in the vehicle width direction, of the rear portion.

* * * * *